(12) United States Patent
Bitto et al.

(10) Patent No.: US 10,989,570 B2
(45) Date of Patent: Apr. 27, 2021

(54) CONNECTION APPARATUS FOR THE MECHANICAL CONNECTING OF AN ELECTRONICS HOUSING AND A MEASURING TRANSDUCER HOUSING

(71) Applicant: Endress + Hauser Flowtech AG, Reinach (CH)

(72) Inventors: Ennio Bitto, Aesch (CH); Andreas Gunzenhauser, Sissaach (CH)

(73) Assignee: Endress + Hauser Flowtec AG, Reinach (CH)

( * ) Notice: Subject to any disclaimer, the term of this patent is extended or adjusted under 35 U.S.C. 154(b) by 250 days.

(21) Appl. No.: 16/060,988

(22) PCT Filed: Nov. 9, 2016

(86) PCT No.: PCT/EP2016/077053
§ 371 (c)(1),
(2) Date: Jun. 11, 2018

(87) PCT Pub. No.: WO2017/097526
PCT Pub. Date: Jun. 15, 2017

(65) Prior Publication Data
US 2018/0364075 A1    Dec. 20, 2018

(30) Foreign Application Priority Data
Dec. 9, 2015   (DE) ................ 10 2015 121 462.8

(51) Int. Cl.
*G01D 11/24* (2006.01)
*G01L 19/00* (2006.01)
(Continued)

(52) U.S. Cl.
CPC .......... *G01D 11/245* (2013.01); *G01D 11/30* (2013.01); *G01F 15/14* (2013.01); *G01F 15/18* (2013.01); *G01L 19/0023* (2013.01)

(58) Field of Classification Search
CPC ...... G01D 11/245; G01D 11/30; G01F 15/14; G01F 15/18; G01L 19/0023
See application file for complete search history.

(56) References Cited

U.S. PATENT DOCUMENTS

| | | |
|---|---|---|
| 4,574,328 A | 3/1986 | Maier |
| 5,796,011 A | 8/1998 | Keita et al. |

(Continued)

FOREIGN PATENT DOCUMENTS

| | | |
|---|---|---|
| CN | 103353355 A | 10/2013 |
| CN | 104024817 A | 9/2014 |

(Continued)

OTHER PUBLICATIONS

German Search Report, German PTO, Munich, dated Jun. 30, 2016.
(Continued)

*Primary Examiner* — Natalie Huls
(74) *Attorney, Agent, or Firm* — Christopher R. Powers; Endress+Hauser (USA) Holding Inc.

(57) ABSTRACT

A connection apparatus comprises: a connecting nozzle having a lumen surrounded by a nozzle wall; as well as a tubular cable duct with a lumen surrounded by a duct wall and extending from a duct end to a duct end remote therefrom for guiding electrical connecting lines. The nozzle wall, or the connecting nozzle formed therewith, has an opening and an opening remote therefrom. The cable duct and the connecting nozzle are additionally so arranged that the cable duct is partially located in the lumen of the connecting nozzle and partially accommodated both by the opening of the nozzle wall as well as also the opening of the nozzle wall, and that a cavity is formed between an inner surface of the nozzle wall facing the lumen and an outer surface of the duct wall facing the lumen. Moreover, the cable duct and the connecting nozzle are so connected together that the cavity is closed gas tightly. The formed (Continued)

measuring transducer by means of such a connection apparatus comprises additionally a measuring transducer housing with a cavity surrounded by a wall as well as, positioned at least partially within the cavity, a sensor element, which is adapted to register a measured variable of a measured substance and to generate least one measurement signal representing the measured variable, wherein the connection apparatus is affixed to the measuring transducer housing. The field device, in turn, includes, moreover, a transmitter electronics electrically connected with the measuring transducer.

22 Claims, 5 Drawing Sheets

(51) Int. Cl.
  *G01D 11/30*    (2006.01)
  *G01F 15/18*    (2006.01)
  *G01F 15/14*    (2006.01)

(56) References Cited

U.S. PATENT DOCUMENTS

| | | | | |
|---|---|---|---|---|
| 2006/0156835 | A1* | 7/2006 | Mueller | G01D 11/245 |
| | | | | 73/866.5 |
| 2006/0225499 | A1 | 10/2006 | Gravel et al. | |
| 2009/0224928 | A1* | 9/2009 | Kopp | G01F 23/284 |
| | | | | 340/614 |
| 2011/0067492 | A1* | 3/2011 | Di Cosola | G01D 11/245 |
| | | | | 73/431 |
| 2012/0266671 | A1* | 10/2012 | Moser | G01P 1/02 |
| | | | | 73/431 |
| 2014/0238126 | A1* | 8/2014 | Vanderaa | H05K 7/1462 |
| | | | | 73/431 |
| 2015/0211902 | A1* | 7/2015 | Fink | G01F 15/14 |
| | | | | 73/431 |
| 2015/0377659 | A1* | 12/2015 | Landis | G01N 33/0057 |
| | | | | 73/431 |
| 2016/0041018 | A1* | 2/2016 | Huber | G01F 1/8413 |
| | | | | 73/861.357 |
| 2016/0091382 | A1* | 3/2016 | Haywood | G01L 19/0092 |
| | | | | 73/723 |
| 2017/0030756 | A1* | 2/2017 | Joshi | G01F 15/18 |
| 2017/0030792 | A1* | 2/2017 | Buck | G01L 19/0672 |
| 2019/0063648 | A1* | 2/2019 | Chen | F16L 41/008 |

FOREIGN PATENT DOCUMENTS

| | | |
|---|---|---|
| DE | 10 2010 030 924 A1 | 12/2011 |
| DE | 20 2013 102 553 U1 | 7/2014 |
| DE | 10 2015 121 462 A1 | 6/2017 |
| WO | 2009/155407 A1 | 12/2009 |
| WO | 2013/028200 A1 | 2/2013 |

OTHER PUBLICATIONS

International Search Report, EPO, The Netherlands, dated Feb. 24, 2017.

Chinese Office Action in corresponding CN Application No. 201680072093.6, dated Dec. 3, 2019.

* cited by examiner

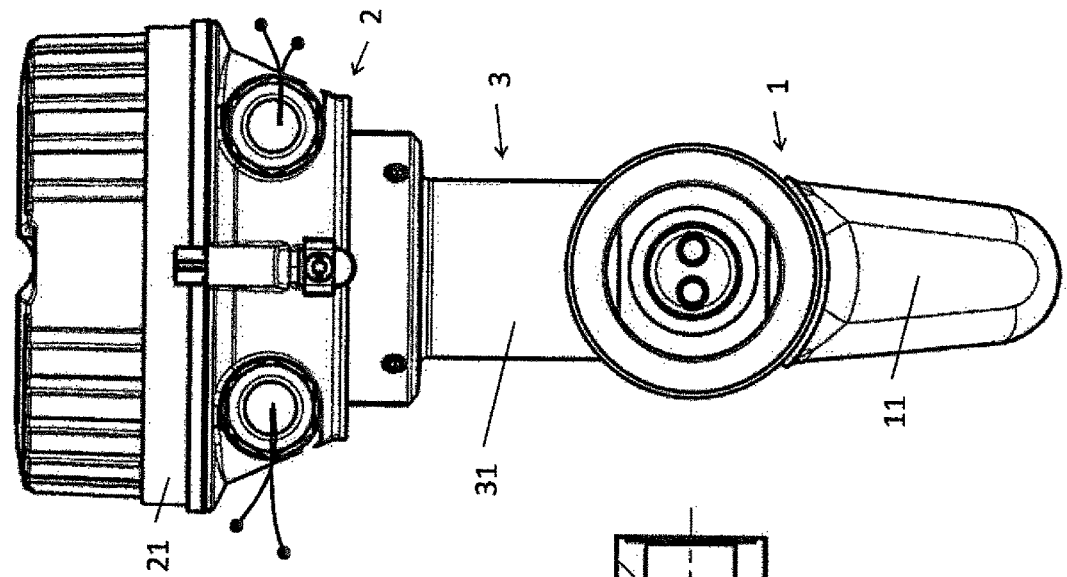
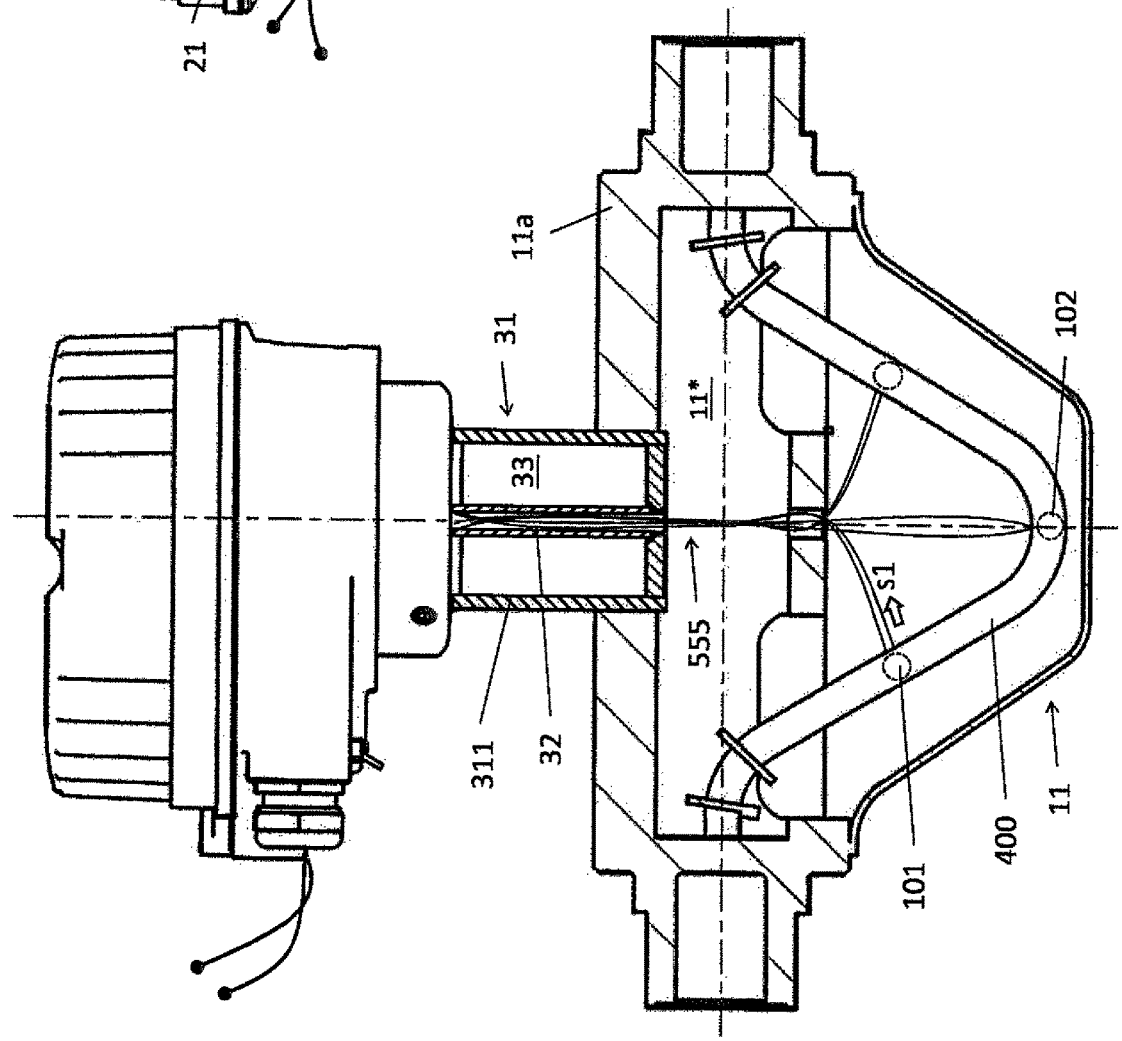
Fig. 2b
Fig. 2a

CONNECTION APPARATUS FOR THE MECHANICAL CONNECTING OF AN ELECTRONICS HOUSING AND A MEASURING TRANSDUCER HOUSING

TECHNICAL FIELD

The invention relates to a connection apparatus for an electronics-housing, namely a protective housing for an electronics, such as e.g. a transmitter electronics of a measuring device of industrial measuring—and automation technology. Moreover, the invention relates to a measuring transducer having such a connection apparatus as well as to a field device having such a measuring transducer.

BACKGROUND DISCUSSION

In industrial process measurements technology, especially also in connection with the automation of chemical processes or procedures for producing a product of a raw or starting material by use of chemical, physical or biological processes and/or the automated control of industrial plants, process-near, electrical measuring- and/or switching devices, so called field devices, such as e.g. Coriolis mass flow measuring devices, density measuring devices, magneto-inductive flow measuring devices, vortex flow measuring devices, ultrasound-flow measuring devices, thermal, mass flow measuring devices, pressure measuring devices, fill level measuring devices, temperature measuring devices, pH-value measuring devices, etc., are applied, which serve for producing—analog or digital—measured values representing process variables as well as measured value signals lastly carrying such. The process variables to be registered can, depending on application, be, for example, a mass flow, a density, a viscosity, a fill level- or a limit-level, a pressure or a temperature or the like, of a liquid, powdered-, vaporous- or gaseous, measured substance, which is guided, or maintained, in a corresponding container, such as e.g. a pipe or a tank.

For registering the particular process variables, such field devices have, in each case, a corresponding physical-electrical or chemical-electrical, measuring transducer. This is most often applied in a wall of the container containing the measured substance or a wall of the line, for example, a pipe, conveying the measured substance and serves to produce at least one electrical measurement signal corresponding to the process variable to be registered. For processing the measurement signal, the measuring transducer is further connected with a measuring device internal, operating and evaluating circuit provided in a transmitter electronics of the field device and serving for further processing or evaluation of the at least one measurement signal and for generating corresponding measured value signals. Further examples of such field devices known, per se, to those skilled in the art, especially also details concerning their application and their operation, are described at length in, among others, German patent, DE-A 3,711,754, European patent, EP-A 984 248, US-A 2004/0183550, US-A 2006/0161359, US-A 20070279173, US-A 2009/0277278, US-A 2011/0317390, US-A 2014/0000374, U.S. Pat. Nos. 4,574,328, 4,716,770, 4,850,213, 5,207,101, 5,796,011, 6,236,322, 6,352,000, 6,366,436, 6,539,819, 6,556,447, 6,662,120, and published international applications, WO-A 00/36 379, WO-A 02/103327, WO-A 2009/078918, WO-A 2013/087390, WO-A 2014/037258 and WO-A 98/14763.

In the case of a large number of field devices of the type being discussed, the measuring transducer for producing the measurement signal is additionally so activated at least at times during operation by a driver signal generated by the operating- and evaluating circuit that it acts in a manner suitable for measuring at least indirectly or, however, also directly via a probe contacting the measured substance, in order to bring about reactions corresponding to the measured variable to be registered. The driver signal can, in such case, be controlled, for example, as regards an electrical current level, a voltage level and/or a frequency. Examples of such active measuring transducers, thus measuring transducers correspondingly applying an electrical driver signal in the measured substance, include, especially, flow measuring transducers serving for measuring media flowing at least at times, e.g. measuring transducers with at least one coil driven by the driver signal for producing a magnetic field or measuring transducers with at least one ultrasonic transmitter driven by the driver signal, or, however, also fill level- and/or limit level transducers serving for measuring and/or monitoring fill levels in a container, such as e.g. those with freely radiating microwave antenna, Goubau-line or vibrating immersion element.

The transmitter electronics of the different devices is most often equipped to be electrically connected via corresponding electrical lines to a superordinated electronic data processing system most often arranged spatially removed, and most often also spatially distributed from the device as well as to be able to send there near in time, or in real time, measured values by means of a measured value signal correspondingly carrying such. Additionally, such devices are during operation usually connected together by means of a data transmission network provided within the superordinated data processing system and/or connected with corresponding electronic process controllers, for example, on-site installed, programmable logic controllers or process-control computers installed in a remote control room, where the measured values, produced, in given cases, by means of the device and suitably digitized and correspondingly coded, are forwarded. By means of such process-control computers, the transmitted measured values can be further processed and displayed as corresponding measurement results e.g. on monitors and/or converted into control signals for other field devices embodied as actuating devices, such as, e.g., magnetically operated valves, electric motors, etc. Since modern field devices can most often also be monitored and, in given cases, controlled and/or configured directly from such control computers, usually also operating data intended for the field devices can be sent to the field devices via the aforementioned data transmission networks, which are most often also hybrid as regards the transmission physics and/or the transmission logic. Serving for data transmission in such industrial data processing systems, at least sectionally, are fieldbusses, especially serial fieldbusses, such as e.g. FOUNDATION FIELDBUS, MODBUS, RACKBUS-RS 485, PROFIBUS, etc., or, for example, also networks based on the ETHERNET standards as well as the corresponding, most often comprehensively standardized, transmission protocols. Besides the evaluating circuits required for processing and converting the measured values delivered by the various connected field device, such superordinated data processing systems have most often also electrical supply circuits, which serve for supplying the connected measuring- and/or switching devices with electrical energy and which provide a corresponding supply voltage, in given cases, fed directly from the connected fieldbus, for the particular transmitter electronics and the electrical lines connected thereto for driving the electrical currents flowing through the particular transmitter electronics. A supply circuit can, in such case, be associated, for example, with exactly one field device and be accommodated together with the evaluating circuit associated with the respective field device, for example, united to a corresponding fieldbus adapter in a shared electronics housing, e.g. one formed as a top hat rail module.

In the case of field devices of the type being discussed, the particular transmitter electronics is most often accommodated in a comparatively robust, for instance, impact-, pressure-, explosion- and/or weather resistant, electronics housing. Examples of such electronics housings are disclosed in, among others, also the aforementioned U.S. Pat. Nos. 6,366,436, 6,556,447 and published international application, WO-A 98/14763. In accordance therewith, electronics housings can be formed, for example, by means of a, most often, pot-shaped, housing basic body having one or more cavities, a, most often, sectionally circularly cylindrical, side wall laterally bounding its cavity, an open end, a rear wall bounding the cavity on an end lying opposite the open end and remote therefrom, for example, a flat or outwardly curved, rear wall, in given cases, also a rear wall, which can be released, as well as a housing lid releasably connected with the housing basic body on its open end, for example, by means of a screwed connection, and closing the housing basic body. The housing lid, which most often also has an integrated viewing window, is usually screwed together with the housing basic body, for example, in the manner of a screwed closure.

The electronics housing with transmitter electronics located therein can be arranged removed from the measuring transducer and connected with such only via a flexible connection cable. The electronics housing, including transmitter electronics located therein, can, however, also be mounted directly on the measuring transducer, such as e.g. shown in U.S. Pat. No. 5,796,011 or 6,662,120, for example, in such a manner that the electronics housing is secured on a tube wall of a measured substance guiding tube of the measuring transducer and/or embodied as a portion of the tube wall, or even in such a manner that the electronics housing is arranged on a sensor element of the measuring transducer housing separately housing the measuring transducer, namely secured on a wall of the measuring transducer housing and/or embodied as a portion of the wall.

Usually, there serves, in such case, a connection apparatus—sometimes also referred to as sensor neck—as a connecting member between the electronics housing and the measuring transducer, or its measuring transducer housing, for defining a predetermined separation between measuring transducer and transmitter electronics. Such a connection apparatus, shown in U.S. Pat. No. 5,796,011 or 6,662,120, includes, for example, in each case, a connection head positioned with a fixed separation from the wall of the transducer housing as well as a connecting nozzle —, for example, a cone shaped connecting nozzle or one formed by means of a metal tube or pipe, consequently a cylindrical connecting nozzle—for mechanical connecting of electronics housing and measuring transducer housing, wherein a first end of the connecting nozzle is connected with the wall of the measuring transducer housing and a second end with the connection head. The connection head, equipped, for example, by or with a connecting flange, or formed therewith, is, in turn, adapted to be mechanically connected, for example, screwed together, with an electronics housing (with transmitter electronics located therein) as well as to guide in a lumen surrounded by a nozzle wall manufactured usually, of a metal, for example, a steel, electrical connecting lines extending from the measuring transducer to the transmitter electronics. The lumen surrounded by the nozzle wall can be hermetically sealed from the atmosphere surrounding the measuring transducer housing, for instance, with application of a connecting line feedthrough at the connection head, second end within the lumen, for example, a feedthrough manufactured of a glass or a synthetic material, e.g. a plastic; moreover, the lumen is typically filled with a gas, especially air.

From the geometric situation lastly established by means of the connection apparatus, namely a separation resulting from a length of the connecting nozzle, a wall thickness of the nozzle wall as well as a size of the lumen surrounded by the nozzle wall as determined by the length as well as also an inner diameter of the connecting nozzle, there results, among other things, also a connection apparatus thermal resistance based both on heat conduction as well as also convection of the gas present in the lumen and opposing a heat flow transferred in total from the measuring transducer to the electronics housing, i.e. there results, correspondingly, a temperature gradient between the measuring transducer and the transmitter electronics. The particular choice of the aforementioned parameters—length of the connecting nozzle, wall thickness of the nozzle wall as well as gas volume enclosed in the connecting nozzle—limits, insofar, also a maximum allowable temperature, which the particular measured substance is permitted to assume, without damaging the transmitter electronics as a result of a too high operating temperature stemming therefrom, or degrading its operation to a no longer compensatable degree. For transmitter electronics, maximum manageable operating temperatures lie typically, for instance, in the range between 85° C. and 115° C. Since the wall thickness of the nozzle wall, as well as also an outer diameter of the connecting nozzle—not least of all also for the purpose of creating a mechanically sufficiently stable and as vibration sensitive as possible, in given cases, additionally also explosion protected connection apparatus—most often are selected rather large, there is present a separation specific, thermal resistance achievable with a connection system of the aforementioned type, measured as a ratio of the above-referenced connection apparatus thermal resistance counteracting the heat flow, as a whole, flowing from the measuring transducer to the electronics housing to a shortest separation between electronics housing and measuring transducer, or its measuring transducer housing, which amounts, regularly, for instance, to a value in the order of magnitude of 80 K/100 mm-110 K/100 mm. As a result of this, connecting apparatuses, e.g. their connecting nozzles, can, at times, not least of all in the case of application in high temperature measuring locations with measured substance temperatures of above 200° C., have comparatively considerable lengths of significantly greater than 100 mm along with a correspondingly great, equally as well actually undesired, lateral extent of the measuring system ultimately formed therewith.

SUMMARY OF THE INVENTION

Starting from the aforementioned state of the art, an object of the invention is to provide a cost effectively manufacturable connection apparatus, which is embodied as simply as possible and which has an increased, separation specific, thermal resistance compared with conventional connecting apparatuses.

For achieving the object, the invention resides in a connection apparatus for mechanical connecting of an electronics housing, namely a protective housing for an electronics, for example, a transmitter electronics, and a measuring transducer housing, namely a protective housing for at least one, for example, physical-to-electrical, sensor element, which connection apparatus comprises: a tubular cable duct with a lumen surrounded by a duct wall and extending from a first duct end to a second duct end remote therefrom for guiding electrical connecting lines, as well as a connecting nozzle, for example, a tubular connecting nozzle, with a lumen surrounded by a nozzle wall, for example, a metal nozzle wall. The nozzle wall, or the connecting nozzle formed therewith, has a first opening and a second opening remote therefrom. Furthermore, the cable duct and the connecting nozzle are so arranged that the cable duct is partially located in the lumen of the connecting nozzle and partially accommodated both by the first opening of the nozzle wall of the connecting nozzle as well as also the second opening of the nozzle wall of the connecting nozzle, and that, between an inner surface of the nozzle wall facing the lumen and an outer surface of the duct wall facing the lumen, a, for example, single, cavity is formed. Moreover, the cable duct and the connecting nozzle are so connected together that the cavity is closed gas tightly, for example, in such a manner that the cavity is hermetically sealed against an atmosphere surrounding the connecting nozzle and the connection apparatus.

Furthermore, the invention resides in a measuring transducer formed by means of such a connection apparatus, wherein the measuring transducer further comprises: a measuring transducer housing with a cavity surrounded by a wall, for example, a wall of metal; as well as, positioned at least partially within the cavity, a sensor element, which is adapted to register a measured variable of a measured substance, for example, a fluid, measured substance, and to generate at least one measurement signal representing the measured variable, and wherein the connection apparatus is affixed to the measuring transducer housing, for example, connected with its wall by material bonding.

Furthermore, the invention resides also in a field device formed by means of such a measuring transducer, wherein the field device further comprises a transmitter electronics electrically connected, for example, by means of electrical connecting lines led in the cable duct, with the measuring transducer —, for example, with a sensor element of the measuring transducer positioned at least partially within the cavity of the measuring transducer housing and/or an oscillation exciter of the measuring transducer positioned within the cavity of the measuring transducer housing.

In a first embodiment of the connection apparatus of the invention, it is, furthermore, provided that the connecting nozzle and the cable duct are adapted to hold a gas in the cavity, for example, nitrogen ($N_2$), argon (Ar), carbon dioxide ($CO_2$), for example, a gas acting with a gas pressure of 1 bar on the nozzle wall and the duct wall.

In a second embodiment of the connection apparatus of the invention, it is, furthermore, provided that the cavity contains a fluid, for example, a fluid having a specific thermal conductivity of less than 0.1 W/(m·K) and/or a gaseous fluid, for example, nitrogen ($N_2$), argon (Ar), carbon dioxide ($CO_2$). Developing this embodiment of the invention further, it is, additionally, provided that the cavity is filled with a gas (e,g, a gas mixture), having a specific thermal conductivity of less than 0.1 W/(m·K), for example, a noble gas and/or a protective-gas, especially in such a manner that a gas pressure reigning in the cavity (33) at 25° C. (room temperature) is less than 300 mbar (millibar) or greater than 0.5 bar.

In a third embodiment of the connection apparatus of the invention, it is, furthermore, provided that the cavity is evacuated/gas-free, at least to the extent that a gas pressure reigning therein at 25° C. (room temperature) is less than 300 mbar (millibar), for example, less than 1 mbar. Developing this embodiment of the invention further, it is, additionally, provided that the gas pressure at 25° C. (room temperature) is less than $10^{-3}$ mbar, for example, less than $10^{-4}$ mbar.

In a fourth embodiment of the connection apparatus of the invention, it is, furthermore, provided that the cable duct is adapted to withstand a static pressure of greater than 100 bar without damage.

In a fifth embodiment of the connection apparatus of the invention, it is, furthermore, provided that the duct wall of the cable duct has a bursting pressure of greater than 300 bar.

In a sixth embodiment of the connection apparatus of the invention, it is, furthermore, provided that the cable duct provides a pressure resistant encapsulation for connecting lines guided therein, for example, a pressure resistant encapsulation meeting the requirements of the standard, IEC 60079-1:2007, or a pressure resistant encapsulation embodied according to the ignition protection type "Pressure-Resistant Encapsulation (Ex-d)" and/or a pressure resistant encapsulation having a pressure resistance of greater than 100 bar.

In a seventh embodiment of the connection apparatus of the invention, it is, furthermore, provided that the connecting nozzle is formed by means of a metal tube or pipe.

In an eighth embodiment of the connection apparatus of the invention, it is, furthermore, provided that the nozzle wall is hollow cylindrical, at least in certain regions.

In a ninth embodiment of the connection apparatus of the invention, it is, furthermore, provided that the cavity is embodied as an annular gap.

In a tenth embodiment of the connection apparatus of the invention, it is, furthermore, provided that cable duct and connecting nozzle are connected together by material bonding.

In an eleventh embodiment of the connection apparatus of the invention, it is, furthermore, provided that cable duct and connecting nozzle are connected together adhesively.

In a twelfth embodiment of the connection apparatus of the invention, it is, furthermore, provided that the cavity is sealed at least air tightly.

In a thirteenth embodiment of the connection apparatus of the invention, it is, furthermore, provided that the nozzle wall is composed of metal, for example, a stainless steel.

In a fourteenth embodiment of the connection apparatus of the invention, it is, furthermore, provided that the duct wall is composed of metal, for example, a stainless steel or titanium.

In a fifteenth embodiment of the connection apparatus of the invention, it is, furthermore, provided that the nozzle wall and duct wall are of the same material.

In a sixteenth embodiment of the connection apparatus of the invention, it is, furthermore, provided that the cable duct is formed by means of a metal tube or pipe.

In a seventeenth embodiment of the connection apparatus of the invention, it is, furthermore, provided that the cable duct is formed by means of a metal hose, for example, by means of a corrugated hose.

In an eighteenth embodiment of the connection apparatus of the invention, it is, furthermore, provided that the nozzle wall has a bursting pressure of greater than 300 bar.

In a nineteenth embodiment of the connection apparatus of the invention, it is, furthermore, provided that the connecting nozzle has cooling fins on an outer surface of the nozzle wall facing away from the lumen, for example, cooling fins embodied as an integral component of the nozzle wall.

In a twentieth embodiment of the connection apparatus of the invention, it is, furthermore, provided that the nozzle wall has a thickness, for example, a smallest thickness, which is greater than 1 mm, for example, greater than 2 mm.

In a twenty first embodiment of the connection apparatus of the invention, it is, furthermore, provided that the duct wall has a thickness, for example, a smallest thickness, which is greater than 0.5 mm, for example, greater than 1 mm.

In a twenty second embodiment of the connection apparatus of the invention, it is, furthermore, provided that the duct wall has a thickness, for example, a smallest thickness, which is greater than a thickness of the nozzle wall, for example, a smallest thickness of the nozzle wall.

In a twenty third embodiment of the connection apparatus of the invention, it is, furthermore, provided that cable duct and connecting nozzle are equally long.

In a twenty fourth embodiment of the connection apparatus of the invention, it is, furthermore, provided that cable duct and connecting nozzle are arranged extending coaxially relative to one another.

In a twenty fifth embodiment of the connection apparatus of the invention, it is, furthermore, provided that the connecting nozzle has a length, which is greater than 50 mm, and/or which is essentially, for example, in the ratio of greater than 2:1, greater than an outer diameter of the connecting nozzle.

In a twenty-sixth embodiment of the connection apparatus of the invention, it is, furthermore, provided that the connecting nozzle has an outer diameter, which is greater than 20 mm.

In a twenty seventh embodiment of the connection apparatus of the invention, it is, furthermore, provided that the cable duct has a length, which is greater than 50 mm, and/or which is essentially, for example, in the ratio of greater than 2:1, greater than an outer diameter of the cable duct.

In a twenty eighth embodiment of the connection apparatus of the invention, it is, furthermore, provided that the cable duct has an outer diameter, which is less than 10 mm, and/or which is essentially, for example, in the ratio of less than 1:2, less than an outer diameter of the connecting nozzle.

In a twenty ninth embodiment of the connection apparatus of the invention, it is, furthermore, provided that the nozzle wall has a first terminal segment lying in the first opening, for example, a membrane like, first terminal segment and/or a first terminal segment axially resilient in the direction of an imaginary longitudinal axis of the cable duct.

In a thirtieth embodiment of the connection apparatus of the invention, it is, furthermore, provided that the nozzle wall has a first terminal segment lying in the first opening, for example, a membrane like, first terminal segment and/or a first terminal segment axially resilient in the direction of an imaginary longitudinal axis of the cable duct, and that the first terminal segment of the nozzle wall is adapted to react with a reversible deformation to a difference—resulting, for example, from a temperature difference between nozzle wall and duct wall changing as a function of time—between relative length changes of the connecting nozzle changing as a function of time and relative length changes of the cable duct changing as a function of time.

In a thirty first embodiment of the connection apparatus of the invention, it is, furthermore, provided that the nozzle wall has a first terminal segment lying in the first opening, for example, a membrane like, first terminal segment and/or a first terminal segment axially resilient in the direction of an imaginary longitudinal axis of the cable duct, and that the first terminal segment of the nozzle wall is formed at least partially by means of a thin washer, namely a washer having a thickness less than a diameter essentially, for example, in the ratio of less than 1:5.

In a thirty second embodiment of the connection apparatus of the invention, it is, furthermore, provided that the nozzle wall has a first terminal segment lying in the first opening, for example, a membrane like, first terminal segment and/or a first terminal segment axially resilient in the direction of an imaginary longitudinal axis of the cable duct, and that the first terminal segment of the nozzle wall has an axial flexibility, which enables without damage a difference between length changes of the connecting nozzle and/or of the cable duct of at least 0.1 mm.

In a thirty third embodiment of the connection apparatus of the invention, it is, furthermore, provided that the nozzle wall has a first terminal segment lying in the first opening, for example, a membrane like, first terminal segment and/or a first terminal segment axially resilient in the direction of an imaginary longitudinal axis of the cable duct, and that the nozzle wall has a second terminal segment lying in the second opening, for example, a membrane like, second terminal segment and/or a second terminal segment axially resilient in the direction of an imaginary longitudinal axis of the cable duct. Developing this embodiment of the invention further, it is, additionally, provided that the second terminal segment of the nozzle wall is adapted to react with a reversible deformation to a difference—resulting, for example, from a temperature difference between nozzle wall and duct wall changing as a function of time—between relative length changes of the connecting nozzle changing as a function of time and relative length changes of the cable duct changing as a function of time. Alternatively or supplementally, the second terminal segment of the nozzle wall can at least partially be formed by means of a thin washer, namely a washer having a thickness less than a diameter essentially, for example, in the ratio of less than 1:5 and/or the second terminal segment of the nozzle wall can have an axial flexibility, which enables without damage a difference between length changes of the connecting nozzle and/or of the cable duct of at least 0.1 mm.

In a thirty fourth embodiment of the connection apparatus of the invention, it is, furthermore, provided that a middle segment of the nozzle wall —, for example, a middle segment extending with lateral separation from the cable duct and/or arranged coaxially with the cable duct—is tubular, for example, has the form of a hollow cylinder.

In a first further development of the connection apparatus of the invention, such further comprises: a connection head connected with the connecting nozzle —, for example, a hollow cylindrical and/or sleeve-shaped, connection head— having a wall extending from a first end facing the connecting nozzle and the cable duct to a second end remote from the connecting nozzle and the cable duct —, for example, a metal wall and/or a wall connected with the nozzle wall by material bonding—as well as a lumen surrounded by the wall, which connection head is adapted to be mechanically connected, for example, releasably, with an electronics housing.

In a first embodiment of the first further development of the connection apparatus of the invention, it is, furthermore, provided that a middle segment of the nozzle wall —, for example, a middle segment extending with lateral separation from the cable duct and/or arranged coaxially with the cable duct—is tubular, for example, hollow cylindrical, and that the wall of the connection head is connected at the first end, for example, gas tightly and/or by material bonding, with the nozzle wall —, for example, with an end of its middle segment facing the connection head —, for example, in such a manner that the lumen of the cable duct communicates with the lumen of the connection head.

In a second embodiment of the first further development of the connection apparatus of the invention, it is, furthermore, provided that connection head, connecting nozzle and cable duct are so arranged that the lumen of the cable duct communicates with the lumen of the connection head.

In a second further development of the connection apparatus of the invention, such further comprises: connected with the connecting nozzle, a connection head —, for example, a hollow cylindrical and/or sleeve-shaped connection head—having a wall extending from a first end facing the connecting nozzle and the cable duct to a second end remote from the connecting nozzle and the cable duct —, for example, a metal wall and/or a wall connected with the nozzle wall by material bonding—as well as a lumen surrounded by the wall, as well as a feedthrough serving for the connection of electrical connecting lines led in the cable duct, wherein the feedthrough is manufactured, for example, of glass, ceramic or synthetic material such as a plastic, In a first embodiment of the second further development of the connection apparatus of the invention, it is, furthermore, provided that the connection head is adapted to be mechanically connected, for example, releasably, with an electronics housing and that the feedthrough is located within the lumen of the connection head and/or held by the wall of the connection head.

In a second embodiment of the second further development of the connection apparatus of the invention, it is, furthermore, provided that the wall of the connection head has at least in the region of the second end an external thread, for example, an external thread, which is adapted to be screwed together with a complementary internal thread of an electronics housing.

In a third embodiment of the second further development of the connection apparatus of the invention, it is, furthermore, provided that the connection head has a connection flange, which is adapted to be connected, for example, releasably, with a complementary connection flange of an electronics housing.

In a first embodiment of the measuring transducer of the invention, it is, furthermore, provided that the connection apparatus is located at least partially, for example, predominantly, removed from the cavity surrounded by the wall.

In a second embodiment of the measuring transducer of the invention, it is, furthermore, provided that the measuring transducer housing is adapted to hold a gas in the cavity, for example, nitrogen ($N_2$) and/or argon (Ar) and/or carbon dioxide ($CO_2$), respectively air, for example, a gas acting with a gas pressure of 1 bar on the nozzle and on the wall and/or a gas having a specific thermal conductivity of less than 0.1 W/(m. K). Developing this embodiment of the invention further, it is, additionally, provided that the cavity of the measuring transducer housing is filled with a gas, e.g. a gas mixture, for example, a protective-gas, for example, a gas having a specific thermal conductivity of less than 0.1 W/(m·K), for example, in such a manner that a gas pressure reigning in the cavity at 25° C. (room temperature) is greater than 0.5 bar.

In a third embodiment of the measuring transducer of the invention, it is, furthermore, provided that a middle segment of the nozzle wall —, for example, a middle segment extending with lateral separation from the cable duct and/or arranged coaxially with the cable duct—is tubular, for example, hollow cylindrical, and that the nozzle wall is connected via an end of its middle segment facing the measuring transducer housing, for example, by material bonding, for example, soldering, brazing or welding, with the wall of the measuring transducer housing.

In a first further development of the measuring transducer of the invention, such further comprises: arranged at least partially within the cavity of the measuring transducer housing, at least one tube, which is adapted to guide in a lumen surrounded by a tube wall, for example, a tube wall of metal, a flowing fluid, for example, a flowing liquid, and which is adapted, for example, to be caused to vibrate, while fluid is flowing through it. The at least one sensor element, for example, the sensor element serving for producing a measurement signal representing vibrations of the at least one tube, can additionally be arranged on the at least one tube, or in its proximity, for example, in such a manner that the sensor element is connected with the tube wall of the tube.

In a second further development of the measuring transducer of the invention, such further comprises: positioned within the cavity of the measuring transducer housing, at least one oscillation exciter, which is adapted to excite the at least one tube to cause it to execute mechanical oscillations.

In a third further development of the measuring transducer of the invention, such further comprises: an electronics housing, namely a protective housing for the transmitter electronics, wherein the transmitter electronics, for example, electrically connected with the measuring transducer by means of electrical connecting lines led in the cable duct, is located within the electronics housing, and wherein the electronics housing is mechanically connected, for example, releasably, with the connection apparatus.

BRIEF DESCRIPTION OF THE DRAWINGS

The invention as well as advantageous embodiments thereof will now be explained in greater detail based on examples of embodiments shown in the figures of the drawing. Equal and equally acting or equally functioning parts are provided in all figures with equal reference characters; when perspicuity requires or it otherwise appears sensible, already mentioned reference characters are omitted in subsequent figures. Other advantageous embodiments or further developments, especially also combinations of, firstly, only individually explained aspects of the invention, will become evident, furthermore, from the figures of the drawing and/or from claims per se.

The figures of the drawing show as follows:

FIGS. 2a and 2b are partially sectioned side and end views of a field device of FIG. 1;

DETAILED DISCUSSION IN CONJUNCTION WITH THE DRAWINGS

Figure 1:
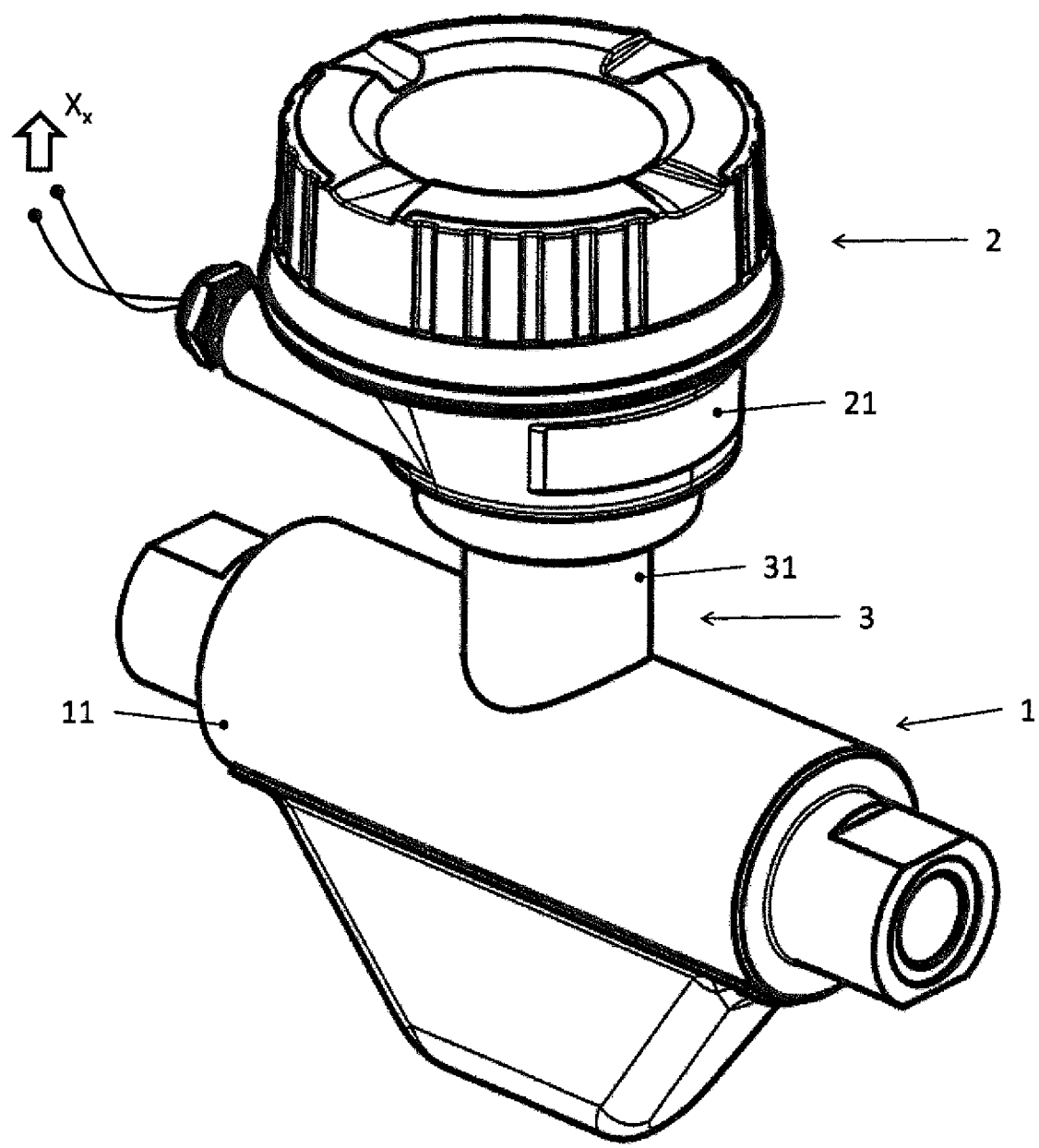
FIG. 1 is a perspective view of a field device having an electronics housing held on a measuring transducer by means of a connection apparatus.

FIGS. 1, 2a and 2b show a field device and individual assemblies of the field device using, as an example, a measuring device suitable for industrial measuring- and automation technology. Especially, the field device is provided and adapted to be used for measuring at least one physical and/or chemical, measured variable of a measured substance, especially a fluid measured substance, guided in a tube, for example, a tube extending at least sectionally through an explosion-endangered zone, and/or in a container, for example, a container located within an explosion-endangered danger zone. The field device can be, for example, a magneto-inductive flow measuring device, a vortex-flow measuring device, an ultrasonic flow measuring device, a thermal, mass flow measuring device, a pressure measuring device, a fill level measuring device, a temperature measuring device, a pH-value measuring device, or a conductivity measuring device, or, as well as also evident from FIG. 2a, or a combination of FIGS. 1, 2a and 2b, for example, a Coriolis, mass flow measuring device.

For registering the at least one measured variable, the field device comprises a measuring transducer 1 having at least one sensor element 101, which is adapted during operation at least at times to generate, or to provide via electrical connecting lines, at least one electrical measurement signal corresponding to the at least one measured variable of the substance to be measured —, for example, a signal having a voltage dependent on the measured variable, an electrical current dependent on the measured variable, or a frequency and/or phase dependent on the measured variable.

For the purpose of a protected accommodating of individual components, or assemblies, of the measuring transducer, not least of all also of the at least one sensor element 101, the measuring transducer comprises, furthermore, a corresponding measuring transducer housing 11. The measuring transducer housing 11 can, as well as also indicated in FIG. 2a, have a wall 11a—, for example, a wall 11a manufactured of a metal—as well as, surrounded by the wall 11a, a cavity 11*, which is adapted to accommodate at least the at least one sensor element 101. In an additional embodiment of the invention, the cavity 11* of the measuring transducer housing (and the field device formed therewith) is hermetically sealed against an atmosphere surrounding the measuring transducer housing, and/or the measuring transducer housing 11 is adapted to hold in its cavity 11* a gas, for example, nitrogen ($N_2$) and/or argon (Ar) and/or carbon dioxide ($CO_2$), respectively a corresponding gas mixture, for example, air, for example, with a gas pressure of 1 bar acting on the wall 11a. Furthermore, it is provided that the cavity 11* is filled with a gas, e.g. gas mixture, for example, a noble gas and/or a protective-gas, having a specific thermal conductivity of less than 0.1 W/(m·K), for example, in such a manner that a gas pressure reigning in the cavity 11* at 25° C. (room temperature) is greater than 0.5 bar. The gas, e.g. gas mixture, can be introduced into the cavity 11*, for example, during the manufacturing of the measuring transducer housing 11, or of the measuring transducer, for example, by trapping a protective gas introduced into the cavity 11* during a soldering-, brazing- or welding process performed under a corresponding protective gas atmosphere. The gas is trapped when the soldering-, brazing- or welding process leads to a sealing of the opening.

Measuring transducer 1 can be, for example, a measuring transducer of vibration-type, namely a measuring transducer having at least one tube flowed-through during operation by the measured substance and caused to vibrate. Accordingly, the measuring transducer further comprises, according to an additional embodiment of the invention, arranged at least partially within the cavity 11* of the measuring transducer housing 11, at least one tube 400, which is adapted to guide a flowing fluid, for example, a flowing liquid, capable of functioning as measured substance, in a lumen surrounded by a tube wall, for example, a metal tube wall, and communicating, for example, with a lumen of a pipe connected to the measuring transducer. The at least one tube 400 is, especially, furthermore, also adapted to be caused to vibrate while a fluid is flowing through it. In such case, the at least one sensor element 101 can additionally be adapted to produce an oscillatory signal capable of functioning as measurement signal s1 representing vibrations of the at least one tube, and/or the sensor element 101 can be arranged on the at least one tube 400, or in its proximity, for example, connected with the tube wall of the tube. For active exciting of mechanical oscillations of the at least one tube 400, the measuring transducer 1 of the invention can, furthermore, be equipped with at least one oscillation exciter 102 likewise positioned within the cavity 11*.

For processing the at least one measurement signal s1 delivered by the measuring transducer, in given cases, also for providing a driver signal for operation and power supply of the measuring transducer 1, for example, its oscillation exciter 102, the field device includes, furthermore, a transmitter electronics 2, for example, formed by means of one or more microprocessors, and electrically connected with the measuring transducer 1, for example, by means of a plurality of connecting lines. The transmitter electronics 2 according to an additional embodiment of the invention is housed within an electronics housing 21 mounted on the measuring transducer 1 —, for example, an electronics housing 21 manufactured from a pressure cast material, for instance, pressure cast aluminum, or a precision cast material, for instance, a stainless steel,—and serves, especially, based on the at least one measurement signal s1 delivered by the measuring transducer, recurringly, to ascertain measured values quantifying the at least one measured variable, for example, mass flow measured values, density measurement values, viscosity measurement values, volume flow measured values, pH-measured values, temperature measured values, or pressure measured values. For on-site visualizing of such field device internally produced, measured values and/or, in given cases, also status reports internally generated by the field device, such as, for instance, a failure report concerning the field device or an alarm concerning the measured substance, or the monitored process, the field device can, furthermore, have a display- and human interaction unit communicating, at least at times, with the transmitter electronics 2, for instance, a unit having an LCD- or TFT-display located in the electronics housing directly behind a viewing window and/or a unit with integrated non-volatile data memory for measurement- and/or for configuration data. The field device can additionally be adapted to be connected via connecting lines to an external electrical energy supply, in given cases, also an external electrical energy supply remote from the device, in order to be supplied with electrical energy during operation. In case required, the electronics housing 21 can, for instance, also be so embodied, through application of sufficiently strong materials, or appropriate material thicknesses, or by implementing the gap dimensions required for flame penetration- and explosion safety, that it meets the requirements for ignition protection type "Pressure-Resistant Encapsulation (Ex-d)", e.g. the standard, IEC 60079-1:2007, for instance in that it can withstand an explosion pressure, possibly arising in the interior, of greater than 50 bar, especially greater than 100 bar, without damage.

Figure 3:
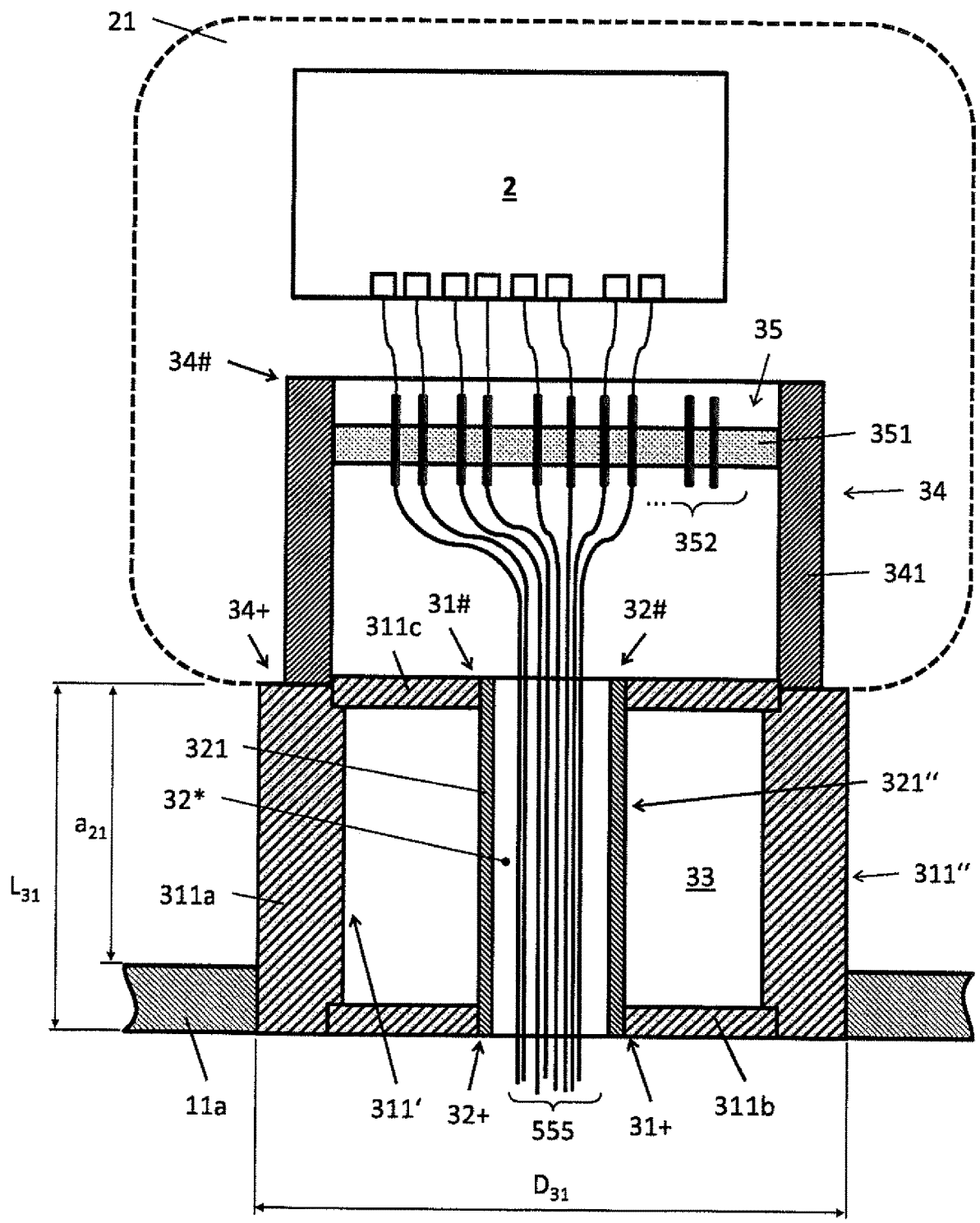
FIG. 3 is a sectioned side view of a connection apparatus suitable fora field device of FIG. 1.
Figure 4:
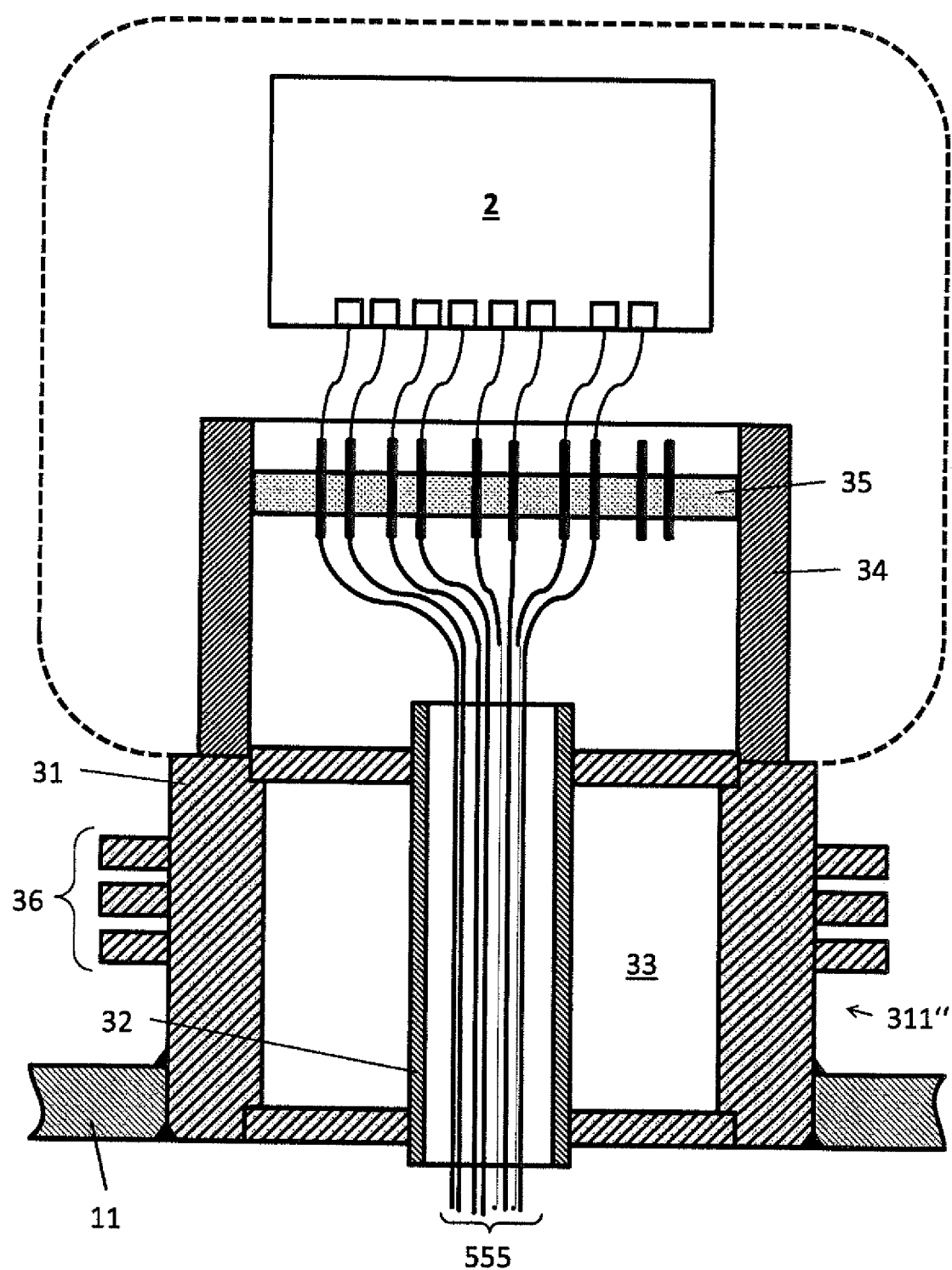
FIGS. 4 and 5 are sectioned side views of other variants of a connection apparatus suitable for a field device of FIG. 1.

The electronics housing 21—here serving, for example, also as an impact- and/or pressure-resistant, protective housing for the transmitter electronics 2 of the field device—is, as schematically shown in FIGS. 3 and 4, or also as directly evident from a combination of FIGS. 1, 2a, 2b, 3, and 4, mounted on the measuring transducer 1, namely on its measuring transducer housing 11, and, indeed, with a predetermined (shortest) separation $a_{21}$. The separation $a_{21}$ takes into consideration not least of all also a maximum temperature of the measured substance and an allowable operating temperature of the transmitter electronics. Especially, the separation $a_{21}$ is so selected that every temperature difference between measuring transducer housing 11 and electronics housing 21, established with such separation in normal operation, or lying within a predetermined specification, is sufficient to be able to keep, or to keep, the operating temperature of the transmitter electronics 2, even at maximum permitted temperature of the measured substance, safely below the aforementioned allowable operating temperature.

Serving for mechanical connecting of the electronics housing 201 and the measuring transducer housing 11 is a connection apparatus 3, for example, a cylindrical, connection apparatus 3. The connection apparatus 3 of the invention, for example, also a connection apparatus 3 embodied as an integral component of the aforementioned measuring transducer 1, comprises a connecting nozzle 31 having a lumen surrounded by a nozzle wall 311—here a hollow cylindrical nozzle wall—as well as a tubular cable duct 32 having a lumen 32* surrounded by a duct wall 321 and extending from a first duct end 32+ to a second duct end 32# remote therefrom for accommodating and guiding electrical connecting lines 555. The connecting lines 555 can be electrically connected, for example, to the sensor element 101 and/or to the oscillation exciter 102, and can be a component of a signal path leading from the aforementioned sensor element 101 to the transmitter electronics 2 and/or even a component of a signal path leading from the transmitter electronics 2 to the aforementioned oscillation exciter 102.

The connecting nozzle 31 of the connection apparatus 3 of the invention, and of the measuring transducer formed therewith, can, such as directly evident from a combination of FIGS. 1, 2a and 2b, be embodied tubularly, for example, in such a manner that a middle segment 311a of the nozzle wall —, for example, a middle segment arranged coaxially with the cable duct 32 and extending with lateral separation around the cable duct 32—forms a tube—here an essentially hollow-cylindrical tube. Accordingly, the nozzle wall 311 can, at least in certain regions, be hollow cylindrical and/or metal. Thus, the connecting nozzle 31 can in simple manner be formed by means of a metal tube or pipe; the connecting nozzle 31 can, however, for example, also be formed by means of a cone. Thus, the nozzle wall 321 can, at least in certain regions, be funnel shaped, and have, at least in certain regions, a frustoconically-shaped contour. In an additional embodiment of the invention, the connecting nozzle 31 has a length $L_{31}$, which is greater than 50 mm and/or the connecting nozzle has an outer diameter $D_{31}$, which is greater than 20 mm. Alternatively or supplementally, it is provided that the above-referenced length $L_{31}$ of the connecting nozzle 31 is essentially greater than the above-referenced outer diameter $D_{31}$ of the connecting nozzle 31, especially in the ratio of greater than 2:1. The connecting nozzle 31 is, furthermore, so embodied and so positioned that, as a result, the connection apparatus 3, as well as also directly evident from FIG. 2a, is located at least partially, or predominantly, removed from the cavity surrounded by the wall. In an additional embodiment of the invention, the connection apparatus 3 is affixed to the measuring transducer housing 11, namely durably connected with its wall 11a, thus connected by material bonding, for example, soldered, brazed or welded. Connecting nozzle 31 and measuring transducer housing 11 can, for example, be connected together by durably connecting the nozzle wall 31 with the wall of the measuring transducer housing 11, as well as also shown in FIGS. 3 and 4, via an end of its middle segment 311a facing the measuring transducer housing 11.

The cable duct 32 of the connection apparatus of the invention can, in turn, be formed, for example, by means of a metal tube or pipe or by means of a metal hose, for example, by means of a corrugated hose. Accordingly, in an additional embodiment, it is, furthermore, provided that the nozzle wall 311 and/or the duct wall 321 are/is composed of metal, for example, aluminum or a metal with a low thermal conductivity of less than 50 $W \cdot m^{-1} \cdot K^{-1}$, such as e.g. titanium (22 $W \cdot m^{-1} \cdot K^{-1}$) or stainless steel, especially a highly alloyed, or austenitic steel (<20 $W \cdot m^{-1} \cdot K^{-1}$). Alternatively or supplementally, the nozzle wall 311 and duct wall 321 can be made of the same material, for example, the same metal. In an additional embodiment of the invention, the cable duct 32 has a length, which is greater than 50 mm, and/or the cable duct 32 has an outer diameter, which is less than 10 mm. Alternatively or supplementally, the cable duct 32 can be so embodied that its length is essentially greater than an outer diameter of the cable duct 32, for example, in a ratio of greater than 2:1. Furthermore, the connecting nozzle 31 and the cable duct 32 can in advantageous manner also be so embodied that the above-referenced outer diameter of the cable duct 32 is essentially less than the above-referenced outer diameter of the connecting nozzle 31, for example, in the ratio of less than 1:2. In an additional embodiment of the invention, it is, furthermore, provided that the nozzle wall has a thickness, for example, a smallest thickness, which is greater than 1 mm, especially greater than 2 mm, or the duct wall has a thickness, for example, a smallest thickness, which is greater than 0.5 mm, especially greater than 1 mm. Alternatively or supplementally, connecting nozzle 31 and cable duct 32 can, furthermore, also be so embodied and dimensioned that, as well as also evident from FIG. 5, a thickness of the duct wall 321 is greater, or not less, than a thickness of the nozzle wall 311, for example, also in such a manner that the above-referenced smallest thickness of the duct wall 321 is greater than above-referenced smallest thickness of the nozzle wall 311; in case required, connecting nozzle 31 and cable duct 32 can, however, also be so embodied and dimensioned that the above-referenced smallest thickness of the duct wall 321, as well as also shown in FIG. 3, is less than the above-referenced smallest thickness of the nozzle wall 311.

Particularly for reasons of increased operational safety required in given cases, or explosion protection required in given cases, the nozzle wall 311 is, according to an additional embodiment of the invention, adapted to withstand without damage an inner positive pressure of greater than 100 bar, for example, as a result of an ignited gas explosion propagating in the connection apparatus 3. For instance, the nozzle wall 311 has a bursting pressure of greater than 300 bar. Alternatively or supplementally, also the cable duct 321 can be adapted to withstand without damage a static pressure—acting internally or externally on the duct wall 321—of greater than 100 bar, or the cable duct 32 can be so embodied that its duct wall 321 has a bursting pressure of greater than 300 bar. Furthermore, the cable duct 32 and/or the connecting nozzle 31 can also be so embodied that there is provided therewith a pressure resistant encapsulation or encasement —, for example, having a pressure resistance of greater than 100 bar, or also meeting the requirements of the standard, IEC 60079-1:2007, or the ignition protection type "Pressure-resistant encapsulation (Ex-d)"—for connecting lines led within the connection apparatus 3, for example, within the cable duct 32.

As directly evident from FIG. 3, or a combination of FIGS. 2b and 3, the nozzle wall 321 of the connection apparatus 3 of the invention includes a first opening 31+—here occupied by a first terminal segment 311b of the nozzle wall facing the measuring transducer 1, or its measuring transducer housing 11—and, remote therefrom, a second opening 31#—here occupied by a second terminal segment 311c of the nozzle wall lying away from the aforementioned terminal segment. Additionally, the cable duct 32 and the connecting nozzle 31 are so arranged that the cable duct 32 is located partially in the lumen of the connecting nozzle 31 and partially accommodated both by the opening 31+ as well as also the opening 31#, and that between an inner surface 311' of the nozzle wall 311 facing the lumen and a lateral surface 321" of the duct wall 321 facing the lumen a cavity 33 is formed —, for example, a cavity embodied as an annular gap, or a hollow, cylindrical shaped cavity. In an additional embodiment of the invention, the cable duct 32 and the connecting nozzle 31 are, furthermore, so embodied or so arranged that the cavity 33 surrounds the cable duct 32. Cable duct 32 and connecting nozzle 31 can accordingly also be so embodied or so arranged that cable duct 32 and connecting nozzle 31 are arranged extending coaxially to one another, or are equally long.

As already mentioned, the connection apparatus is, especially, also embodied to establish between measuring transducer housing 11 and electronics housing 21 during operation a temperature difference $\Delta T$, which assures that the operating temperature of the transmitter electronics 2 even at maximum temperature of the measured substance is not unallowably high or assumes values no longer specified. For such purpose, the connection apparatus is correspondingly designed to provide a thermal resistance $R_{th}$, namely a thermal resistance according to the known formula $R_{th}=\Delta T/\dot{Q}v$, for opposing heat flow $\dot{Q}v$ flowing from the measuring transducer housing 11 further via the connection apparatus 3 to the electronics housing 21, such that the desired temperature difference is maintained. For the purpose of providing a connection apparatus with an as high as possible thermal resistance and with a simultaneously as small as possible structural length corresponding to the aforementioned shortest separation $a_{12}$ between electronics housing 21 and measuring transducer housing 11, i.e. a structural length determining the separation $a_{12}$, the cable duct 32 and the connecting nozzle 32 of the invention are, furthermore, so embodied and additionally so connected together—namely, in each case, in the region of the openings 31+, 31#—that the cavity 33 is closed gas tightly, or that the cavity 33 is hermetically sealed against an atmosphere surrounding the connecting nozzle 31, or the connection apparatus formed therewith. Cable duct 32 and connecting nozzle 31 can for such purpose —, depending on material applied for the nozzle wall and the duct wall-, for example, be connected together by material bonding, for example, by means of a weld-, or braze- or solder seam, or, for example, also adhesively, for example, by means of a epoxide resin, or by means of a metal adhesive. Due to the sealing of the cavity 33, a convection based heat transport between the measuring transducer housing 11 and connection apparatus 3 or between connection apparatus 3 and electronics housing 21 can take place neither via openings 31+ nor via openings 31#; a possible heat transport from the measuring transducer housing through the connection apparatus to the electronics housing can essentially occur only based on heat conduction. Because of the significant suppression of convection based heat transport through the connection apparatus, or within the same, the thermal resistance can be increased compared with conventional, convection based heat transport enabling connecting apparatuses of the type being discussed in the case of otherwise equal dimensions, not least of all also equal structural length, i.e. a separation specific, thermal resistance $R_{th}/L_{31}$, measured as a ratio of the thermal resistance $R_{th}$ of the connection apparatus 3 to the above-referenced length $L_{31}$ of the connecting nozzle 31 can accordingly be increased mentionably in very simple manner. Associated therewith, so also the shortest separation $a_{12}$ between electronics housing 21 and measuring transducer housing 11 can correspondingly be lessened compared with conventional connecting apparatuses at otherwise equal conditions, not least of all also equal maximum temperature of the measured substance, or equal maximum permitted operating temperature of the transmitter electronics 2.

For the purpose of an additional increasing of the aforementioned separation specific, thermal resistance $R_{th}/L_{31}$ of the connection apparatus 3, its cavity 33 contains according to an additional embodiment of the invention a fluid having a specific thermal conductivity of less than 0.1 W/(m·K), especially namely a fluid in the form of a gas, such as, for instance, nitrogen ($N_2$), argon (Ar), carbon dioxide ($CO_2$) or another noble-, or protective, gas or a gas mixture containing at least one noble-, or protective gas; this, especially, also in such a manner that a gas pressure reigning in the cavity 33 at 25° C. (room temperature) is less than 300 mbar (millibar) or greater than 0.5 bar. Accordingly, the connecting nozzle 31 and the cable duct 32 are according to an additional embodiment of the invention, furthermore, adapted durably to hold in the cavity 33 a gas acting with a gas pressure of 1 bar and/or with a gas pressure of less 0.5 bar on the connecting nozzle- and the duct wall, or durably to avoid a supply of other gas from an atmosphere surrounding the connecting nozzle. The gas, e.g. gas mixture, can, for example, in turn, be introduced into the cavity 33 during the manufacturing of the connection apparatus, or of measuring transducer, for example, by trapping a (protective) gas introduced into the cavity 33 during a solder-, brazing- or welding process performed under a corresponding protective gas-atmosphere simply by sealing the cavity 33 as a result of the process. Alternatively to the aforementioned filling of the cavity 33 with a gas, according to another embodiment of the invention, it is provided that the cavity 33 for the purpose of providing an as high as possible separation specific, thermal resistance $R_{th}/L_{31}$ is evacuated at least to the extent, consequently gas-free, that a gas pressure reigning therein at 25° C. (room temperature) is less than 300 mbar (millibar), such that at least a rough vacuum is produced in the cavity 33. In case required, the gas pressure in the cavity 33 can also be set to less than 1 mbar, for example, also in such a manner that in the cavity 33 at least a gas pressure of less than $10^{-3}$ mbar, especially namely less than $10^{-4}$ mbar, i.e. a correspondingly high vacuum, is produced. The above-referenced vacuum can be established in the cavity 33, for example, directly during the manufacturing of the connection apparatus, or of the measuring transducer, for example, in that a vacuum established in the cavity 33 during a soldering-, brazing- or welding process performed under vacuum, especially namely under coarse- or high vacuum, remains therein as a result of a sealing of the cavity 33.

Figure 5:
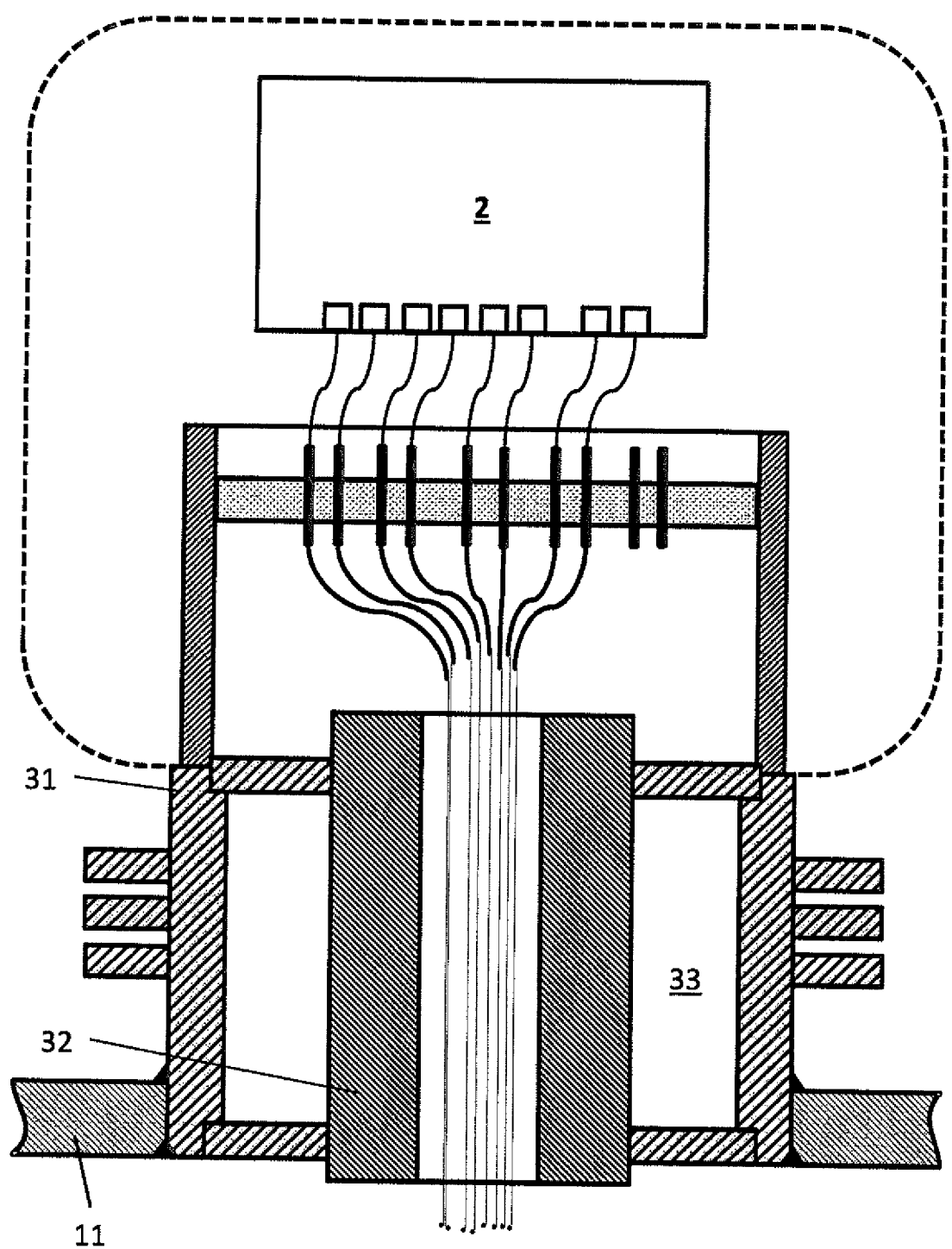

In an additional embodiment of the invention, the connecting nozzle includes, as well as also schematically shown in FIG. 4, on an outer surface 311" of the nozzle wall 311 facing away from the lumen, cooling fins 36, which serve, especially, to increase surface area of the nozzle wall giving off heat from the nozzle wall to a surrounding atmosphere. Since the cooling fins 36 are embodied, for example, as rings surrounding the connecting nozzle, they additionally increase a pressure resistance of the connecting nozzle in the case of otherwise equal dimensions, not least of all also in the case of relatively small thickness of the nozzle wall 311, for instance, 1 mm. The cooling fins 36 can be embodied, for example, as an integral component of the nozzle wall or, for example, also be later pushed on to the connecting nozzle and then connected by material bonding, for instance, by welding. The thermal resistance $R_{th}/L_{31}$ of the connection apparatus can additionally also be further increased in simple manner, in that connecting nozzle 31 and cable duct 32, such as already mentioned, or as schematically shown in FIG. 5, are so embodied and dimensioned that a thickness of the duct wall 321 is greater than a thickness of the nozzle wall 311.

In an additional embodiment of the invention, the nozzle wall 311 includes, as well as also schematically shown in FIG. 3, a first terminal segment 311b lying in the opening 31+—here a first terminal segment facing toward the measuring transducer 10, or its measuring transducer housing 100 —, and the nozzle wall 311 has a second terminal segment 311c lying in the opening 31#-namely a second terminal segment facing away from the measuring transducer 10, and remote from its measuring transducer housing 100. Particularly for the purpose of preventing too high mechanical stresses within the nozzle wall 31, especially in a region around the opening 31+ and/or in a region around the opening 31#, or within the cable duct 32, at least one of the segments 311b, 311c can, furthermore, be embodied axially flexibly in the direction of an imaginary longitudinal axis of the cable duct. For example, the segment 311b can have an axial flexibility, which enables a difference between, for example, thermally related, length changes of the connecting nozzle 31 and/or of the cable duct 32 of at least 0.1 mm without damage, or the segment 311b can be adapted to react with a reversible deformation in the face of a difference of 0.1% or less between relative length changes of the connecting nozzle 31 changing as a function of time and relative length changes of the cable duct 32 changing as a function of time. Accordingly, the segment 311b can, as well as also shown in FIG. 3, be embodied membrane-like, or the segment 311b can be at least partially formed by means of a thin washer, namely a washer having a smaller thickness relative to a diameter, essentially, for example, in the ratio of less than 1:5. Alternatively or supplementally, also the segment 311c can be embodied membrane-like, or at least partially be formed by means of a thin washer. The above-referenced difference between relative length changes of connecting nozzle 31 and cable duct 32 can result, for example, from a temperature distribution changing as a function of time within the connection apparatus, along with temperature differences between nozzle wall and duct wall changing as a function of time, or with changing as a function of time, equally as well diverging, relative length changes of nozzle wall and duct wall.

In an additional embodiment of the invention, the connection apparatus 3 includes, furthermore, a connection head 34 durably connected with the connecting nozzle 31 or formed thereon—here namely with, or at, the end of the connecting nozzle 31 away from the measuring transducer, or the measuring transducer housing. The connection head has a wall 341 extending from a first end 34+ facing the connecting nozzle 31 and the cable duct 32 to a second end 34# remote from connecting nozzle 31 and cable duct 32 as well as a lumen surrounded by the wall 341. Correction head 34 and connecting nozzle 31 can, for example, be connected together, in that the wall 341 is connected at its end 34+ gas- and pressure-tightly with the nozzle wall 311, be it by subsequent joining together, for instance, by manufacture of a material bond, or by making both the connection head 34 and the connecting nozzle 31 one, monolithic, formed part. As schematically shown in FIG. 3, the end 34+ of the wall 341 can, for example, adjoin directly on or be connected with an end of the middle segment 311a of the nozzle wall 311 facing the connection head 34. The wall 341 of the connection head 34 —, for example, a hollow cylindrical, or sleeve-shaped, connection head 34—can be connected with the nozzle wall 311 by material bonding, for example, by welding, soldering or brazing, or, such as already mentioned, for example, also be an integral component of a monolithic, formed part formed together with the nozzle wall 311. Accordingly, the wall 341 of the connection head and the nozzle wall 311 can in advantageous manner also be produced of the same material and/or the wall 341 can be metal, for example, a stainless steel or aluminum. In an additional embodiment of the invention, connecting nozzle 31, cable duct 32 and connection head 34 are, furthermore, so embodied and arranged that the lumen of the cable duct 32 communicates with the lumen of the connection head 34. In case required, the cable duct 32 can be sealed, in given cases, also pressure —, or gas tightly, on at least one its ends 32+, 32# by means of a plug gripping or enclosing the connecting lines.

Connection head 34 is, as well as also directly evident from FIG. 3 or a combination of FIGS. 1, 2a, 2b and 3, especially, adapted to be connected mechanically, especially releasably, with the aforementioned electronics housing 21, or to provide a fixed, mechanical connection between electronics housing 21 and connecting nozzle 31. Accordingly, the wall 341 of the connection head 34 includes, according to an additional embodiment of the invention, an external thread at least in the region of the end 34#. The external thread is, especially, adapted to be screwed together with a complementary, internal thread of an electronics housing. Alternatively, the connection head can, however, also have a connection flange, which is adapted to be connected, for example, also releasably, with a complementary connection flange of an electronics housing.

In an additional embodiment of the invention, the connection apparatus 3 further comprises a feedthrough 35, which is especially provided, or adapted, to be connected to electrical connecting lines 555 led in the cable duct 32, and/or to lead electrical current-, or signal paths formed by means of the electrical connecting lines 555 further into an interior of the electronics housing 21 held by the connection apparatus 2, for example, connected in the aforementioned manner with the connection head 34. The feedthrough 35 is, as well as also schematically shown in FIG. 3, placed within the lumen of the connection head 34, for example, near to the end 34#, or held by the wall 341 of the connection head 34. Feedthrough 35 can be manufactured of a glass, a ceramic or a synthetic material, e.g. a plastic, thus an electrically non-conducting material, for example, in such a manner that contact pins 352 serving as electrical current buses are embedded mutually spaced, equally as well mutually electrically insulated from one another in a monolithic platform 351—correspondingly manufactured of glass, ceramic, or synthetic material. Connection head 34 and feedthrough 35 can, furthermore, be so embodied and connected together that within connection head 34 in a region between the end 34+ (or the corresponding end 31# of the connecting nozzle 31, or its nozzle wall 311) and the feedthrough 35 an outwardly closed cavity, especially a hermetically sealed cavity, is formed, for example, in such a manner that by means of the connecting nozzle 31, the connection head 34 as well as the therein held feedthrough 35, in given cases. also in interaction with the cable duct 32 and the measuring transducer housing 11, a pressure resistant, for example, having a pressure resistance of greater than 100 bar, encapsulation is formed for connecting lines led therein. The encapsulation can in advantageous manner additionally be so embodied that it meets the requirements of the standard, IEC 60079-1:2007, or the ignition protection type "Pressure-Resistant Encapsulation (Ex-d)".

The invention claimed is:

1. A connection apparatus for mechanical connecting of a protective housing for an electronics and a measuring transducer housing, including at least one sensor element, the connection apparatus comprising:
   a tubular connecting nozzle, said connecting nozzle including a lumen surrounded by a metal nozzle wall; and
   a tubular cable duct including a lumen surrounded by a duct wall and extending from a first duct end to a second duct end remote therefrom for guiding electrical connecting lines, wherein:
      said nozzle wall, or the connecting nozzle formed therewith, includes a first opening and a second opening remote therefrom;
      said cable duct and connecting nozzle are so arranged:
         that said cable duct is partially located in the lumen of said connecting nozzle and partially accommodated both by said first opening of the nozzle wall of said connecting nozzle and said second opening of the nozzle wall of said connecting nozzle; and
         that between an inner surface of said nozzle wall facing the lumen and an outer surface of said duct wall facing the lumen a cavity is formed;
      said cable duct and said connecting nozzle are so connected, by material bonding or adhesively, that said cavity is closed gas tightly, in such a manner that the cavity is hermetically sealed against an atmosphere surrounding said connecting nozzle;
      said tubular connecting nozzle and the cable duct are adapted to hold a gas in said cavity, said cavity containing a fluid;
   wherein said cavity is filled with a gas showing a specific thermal conductivity of less than 0.1 W/(m-K).

2. The connection apparatus as claimed in claim 1, wherein:
   said tubular connecting nozzle and the cable duct are adapted to hold a gas in said cavity, the gas acting with a gas pressure of 1 bar on said nozzle wall and said duct wall.

3. The connection apparatus as claimed in claim 1, wherein:
   said cavity contains at least one of nitrogen, argon, and carbon dioxide.

4. The connection apparatus as claimed in claim 3, wherein:
   said cavity is filled with a noble gas and/or a protective gas.

5. The connection apparatus as claimed in claim 1, wherein:
   said cable duct is adapted to withstand a static pressure of greater than 100 bar without damage; and/or
   said duct wall of said cable duct has a bursting pressure of greater than 300 bar; and/or
   said cable duct provides a pressure resistant encapsulation for connecting lines led therein, the pressure resistant encapsulation meeting the requirements of the standard, IEC 60079-1:2007, or a pressure resistant encapsulation according to the ignition protection type "Pressure-Resistant Encapsulation (Ex-d)" and/or a pressure resistant encapsulation having a pressure resistance of greater than 100 bar.

6. The connection apparatus as claimed in claim 1, wherein:
   said nozzle wall is composed of metal; and/or
   said duct wall is composed of metal; and/or
   said nozzle wall and duct wall are of the same material; and/or
   said cable duct is formed by means of a corrugated metal hose; and/or
   said nozzle wall has a bursting pressure of greater than 300 bar; and/or
   said connecting nozzle has cooling fins on an outer surface of said nozzle wall facing away from its lumen.

7. The connection apparatus as claimed in claim 1, wherein:
   said nozzle wall has a thickness greater than 1 mm; and/or
   said duct wall has a thickness greater than 0.5 mm; and/or
   said duct wall has a thickness greater than a thickness of said nozzle wall; and/or
   said cable duct and said connecting nozzle are equally long; and/or
   said cable duct and said connecting nozzle are arranged extending coaxially relative to one another; and/or
   said connecting nozzle has a length that is greater than 50 mm and/or that is greater than an outer diameter of the connecting nozzle by a ratio of more than 2:1; and/or
   said connecting nozzle has an outer diameter that is greater than 20 mm; and/or
   said cable duct has a length that is greater than 50 mm and/or that is greater than an outer diameter of the cable duct by a ratio of more than 2:1; and/or
   said cable duct has an outer diameter that is less than 10 mm and/or less than an outer diameter of said connecting nozzle by a ratio of less than 1:2.

8. The connection apparatus as claimed in claim 1, wherein:
   said nozzle wall has a first terminal segment disposed in the first opening, a membrane-like, first terminal segment and/or a first terminal segment axially resilient in the direction of an imaginary longitudinal axis of said cable duct.

9. The connection apparatus as claimed in claim 8, wherein:
   said first terminal segment of said nozzle wall is adapted to react with a reversible deformation to a difference resulting from a temperature difference between said nozzle wall and said duct wall changing as a function of time between relative length changes of said connecting nozzle changing as a function of time and relative length changes of said cable duct changing as a function of time; and/or
   said first terminal segment of said nozzle wall is formed at least partially by a thin washer having a thickness less than a diameter in a ratio of less than 1:5; and/or said first terminal segment of said nozzle wall has an axial flexibility, which enables without damage a difference between length changes of said connecting nozzle and/or of said cable duct of at least 0.1 mm.

10. The connection apparatus as claimed in claim 8, wherein:
said nozzle wall has a second terminal segment lying in the second opening, especially a membrane-like, second terminal segment and/or a second terminal segment axially resilient in the direction of an imaginary longitudinal axis of said cable duct.

11. The connection apparatus as claimed in claim 10, wherein:
said second terminal segment of said nozzle wall is adapted to react with a reversible deformation to a difference resulting from a temperature difference between said nozzle wall and said duct wall changing as a function of time between relative length changes of said connecting nozzle changing as a function of time and relative length changes of said cable duct changing as a function of time; and/or
said second terminal segment of said nozzle wall is formed at least partially a thin washer having a thickness less than a diameter in the ratio of less than 1:5; and/or
said second terminal segment of said nozzle wall has an axial flexibility, which enables without damage a difference between length changes of said connecting nozzle and/or of said cable duct of at least 0.1 mm.

12. The connection apparatus as claimed in claim 10, wherein:
said first terminal segment of said nozzle wall and said second terminal segment of said nozzle wall are adapted to enable without damage a difference between length changes of said connecting nozzle and said cable duct of at least 0.1 mm, in that said first terminal segment of said nozzle wall and said second terminal segment of said nozzle wall have, as a whole, an axial flexibility, which enables without damage a difference between length changes of said connecting nozzle and said cable duct of at least 0.1 mm.

13. The connection apparatus as claimed in claim 1, wherein:
a middle segment of said nozzle wall extending with lateral separation around said cable duct and/or a middle segment arranged coaxially with said cable duct is a hollow cylindrical tube.

14. The connection apparatus as claimed in claim 13, wherein:
said wall of the connection head is connected at the first end, gas tightly and/or by material bonding, with said nozzle wall with an end of its middle segment facing the connection head in such a manner that the lumen of said cable duct communicates with the lumen of said connection head.

15. The connection apparatus as claimed in claim 1, further comprising:
a connection head connected with said connecting nozzle wherein the connection head is hollow cylindrical and/or sleeve-shaped and includes a wall extending from a first end facing said connecting nozzle and said cable duct to a second end, remote from said connecting nozzle and said cable duct, and/or a wall connected with said nozzle wall by material bonding and a lumen surrounded by the wall, which connection head is adapted to be mechanically connected with an electronics housing.

16. The connection apparatus as claimed in claim 15, wherein:
said connection head, said connecting nozzle and said cable duct are so arranged that the lumen of said cable duct communicates with the lumen of said connection head.

17. The connection apparatus as claimed in claim 15, further comprising:
a feedthrough serving for connection of electrical connecting lines led in said cable duct and manufactured, of glass, ceramic or a synthetic material, wherein said feedthrough is located within the lumen of said connection head and/or held by the wall of said connection head.

18. The connection apparatus as claimed in claim 15, wherein:
said wall of said connection head has at least in the region of the second end an external thread.

19. The connection apparatus as claimed in claim 18, wherein:
said external thread is adapted to be screwed together with a complementary internal thread of an electronics housing.

20. The connection apparatus as claimed in claim 15, wherein:
said connection head has a connection flange, which is adapted to be connected, releasably, with a complementary connection flange of an electronics housing.

21. A connection apparatus for mechanical connecting of a protective housing for a transmitter electronics and a measuring transducer housing for at least one sensor element, the connection apparatus comprising:
a connecting nozzle, said connecting nozzle including a lumen surrounded by a nozzle wall; and
a tubular cable duct with a lumen surrounded by a duct wall and extending from a first duct end to a second duct end remote therefrom for guiding electrical connecting lines, wherein:
said nozzle wall, or the connecting nozzle formed therewith, includes a first opening and a second opening remote therefrom;
said cable duct and connecting nozzle are so arranged:
that said cable duct is partially located in the lumen of said connecting nozzle and partially accommodated both by said first opening of the nozzle wall of said connecting nozzle and said second opening of the nozzle wall of said connecting nozzle; and
that between an inner surface of said nozzle wall facing the lumen and an outer surface of said duct wall facing the lumen a cavity is formed; and
said cable duct and said connecting nozzle are so connected that said cavity is closed gas tightly in such a manner that the cavity is hermetically sealed against an atmosphere surrounding the said connecting nozzle; and
said cavity is evacuated and gas-free, respectively, at least to the extent that a gas pressure reigning therein at 25° C. is less than 300 mbar.

22. The connection apparatus as claimed in claim 21, wherein:
the gas pressure at 25° C. is less than 1 mbar.

* * * * *